US010355748B2

(12) United States Patent
Tanabe

(10) Patent No.: US 10,355,748 B2
(45) Date of Patent: Jul. 16, 2019

(54) ELECTRONIC DEVICE CAPABLE OF PERFORMING WIRELESS COMMUNICATION, METHOD OF CONTROLLING THE ELECTRONIC DEVICE, AND PROGRAM

(71) Applicant: CANON KABUSHIKI KAISHA, Tokyo (JP)

(72) Inventor: Akihiro Tanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 350 days.

(21) Appl. No.: 15/212,106

(22) Filed: Jul. 15, 2016

(65) Prior Publication Data

US 2017/0026087 A1 Jan. 26, 2017

(30) Foreign Application Priority Data

Jul. 22, 2015 (JP) .................................. 2015-145135

(51) Int. Cl.
| | | |
|---|---|---|
| *H04B 5/00* | (2006.01) | |
| *G06K 7/10* | (2006.01) | |
| *H02J 50/80* | (2016.01) | |
| *H02J 50/12* | (2016.01) | |
| *H02J 7/02* | (2016.01) | |
| *H02J 7/04* | (2006.01) | |
| *H02J 7/00* | (2006.01) | |

(52) U.S. Cl.
CPC ....... *H04B 5/0037* (2013.01); *G06K 7/10158* (2013.01); *G06K 7/10237* (2013.01); *H02J 7/0047* (2013.01); *H02J 7/025* (2013.01); *H02J 7/045* (2013.01); *H02J 50/12* (2016.02); *H02J 50/80* (2016.02); *H04B 5/0062* (2013.01); *H02J 2007/005* (2013.01); *H02J 2007/0096* (2013.01)

(58) Field of Classification Search
CPC ... H04B 5/0037; H04B 5/0062; H02J 7/0047; H02J 7/045; H02J 7/025; H02J 50/12; H02J 50/80; H02J 2007/005; H02J 2007/0096; G06K 7/10237; G06K 7/10158
See application file for complete search history.

(56) References Cited

U.S. PATENT DOCUMENTS 9,717,056 B2 * 7/2017 Tsukamoto ........ G06Q 20/3278
2006/0184705 A1 * 8/2006 Nakajima ............. H02J 7/0004
710/303

(Continued)

FOREIGN PATENT DOCUMENTS

| JP | 2011-151746 A | 8/2011 |
|---|---|---|
| JP | 2014-75934 A | 4/2014 |

*Primary Examiner* — Jared Fureman
*Assistant Examiner* — Michael J Warmflash
(74) *Attorney, Agent, or Firm* — Canon U.S.A., Inc. IP Division

(57) ABSTRACT

An electronic device that communicates with a communication apparatus includes a connection unit that connects to a battery, a storage unit accessible from an external apparatus via a close proximity wireless communication, a control unit that performs control such that information used in executing one of a plurality of functions including a wireless power transmission function is stored in the storage unit, wherein the control unit performs the control such that information associated with the wireless power transmission function is stored in the storage unit depending on a charge status of the battery.

19 Claims, 11 Drawing Sheets

(56) References Cited

U.S. PATENT DOCUMENTS

| | | | | |
|---|---|---|---|---|
| 2009/0312046 A1* | 12/2009 | Clevenger | ............... | H02J 17/00 |
| | | | | 455/522 |
| 2011/0115923 A1* | 5/2011 | Moritomo | ............... | G06F 21/31 |
| | | | | 348/207.1 |
| 2013/0342160 A1* | 12/2013 | Tanabe | .................... | H02J 7/025 |
| | | | | 320/108 |
| 2014/0184148 A1* | 7/2014 | Van Der Lee | ....... | H04B 5/0031 |
| | | | | 320/108 |

* cited by examiner

FIG. 4A

| ADDRESS | OFFSET | 7 | 6 | 5 | 4 | 3 | 2 | 1 | 0 | |
|---|---|---|---|---|---|---|---|---|---|---|
| 0 | 0 | \multicolumn{8}{c|}{RTD Header} | ⎫ |
| 1 | 1 | \multicolumn{8}{c|}{TYPE LENGTH = 0x03} | |
| 2 | 2 | \multicolumn{8}{c|}{PAYLOAD LENGTH = 0x13} | |
| 3 | 3 | \multicolumn{8}{c|}{TYPE (1/3) = 0x49 ('I')} | 401 |
| 4 | 4 | \multicolumn{8}{c|}{TYPE (2/3) = 0x44 ('D')} | |
| 5 | 5 | \multicolumn{8}{c|}{TYPE (3/3) = 0x58 ('X')} | |
| 6 | 6 | \multicolumn{8}{c|}{SPECIFYING INDEX NUMBER} | ⎭ |
| 7 | 0 | \multicolumn{8}{c|}{RTD Header} | ⎫ |
| 8 | 1 | \multicolumn{8}{c|}{TYPE LENGTH = 0x03} | |
| 9 | 2 | \multicolumn{8}{c|}{PAYLOAD LENGTH = 0x03} | |
| 10 | 3 | \multicolumn{8}{c|}{TYPE (1/3) = 0x57 ('W')} | |
| 11 | 4 | \multicolumn{8}{c|}{TYPE (2/3) = 0x50 ('P')} | 402 |
| 12 | 5 | \multicolumn{8}{c|}{TYPE (3/3) = 0x54 ('T')} | |
| 13 | 6 | \multicolumn{8}{c|}{INDEX NUMBER} | |
| 14 | 7 | \multicolumn{8}{c|}{DEVICE TYPE} | |
| 15 | 8 | \multicolumn{8}{c|}{DATA LENGTH OF RECORD INFORMATION} | ⎭ |
| 16 | 0 | \multicolumn{8}{c|}{RTD Header} | ⎫ |
| 17 | 1 | \multicolumn{8}{c|}{TYPE LENGTH = 0x02} | |
| 18 | 2 | \multicolumn{8}{c|}{PAYLOAD LENGTH = 0x03} | |
| 19 | 3 | \multicolumn{8}{c|}{TYPE (1/3) = 0x49 ('F')} | 403 |
| 20 | 4 | \multicolumn{8}{c|}{TYPE (2/3) = 0x41 ('A')} | |
| 21 | 5 | \multicolumn{8}{c|}{INDEX NUMBER} | |
| 22 | 6 | \multicolumn{8}{c|}{DEVICE TYPE} | |
| 23 | 7 | \multicolumn{8}{c|}{DATA LENGTH OF RECORD INFORMATION} | ⎭ |

FIG. 4B

| ADDRESS | OFFSET | 7 | 6 | 5 | 4 | 3 | 2 | 1 | 0 | |
|---|---|---|---|---|---|---|---|---|---|---|
| 0 | 0 | \multicolumn{8}{c}{RTD Header} | |
| 0 | 0 | RTD Header ||||||||  |
| 1 | 1 | TYPE LENGTH = 0x03 |||||||| |
| 2 | 2 | PAYLOAD LENGTH = 0x06 |||||||| |
| 3 | 3 | TYPE (1/3) = 0x49 ('I') |||||||| |
| 4 | 4 | TYPE (2/3) = 0x44 ('D') |||||||| |
| 5 | 5 | TYPE (3/3) = 0x58 ('X') |||||||| 411 |
| 6 | 6 | SPECIFYING INDEX NUMBER |||||||| |
| 7 | 7 | DEVICE TYPE |||||||| |
| 8 | 8 | DATA LENGTH OF RECORD INFORMATION |||||||| |
| 9 | 9 | 0x57 ('W') |||||||| |
| 10 | 10 | 0x50 ('P') |||||||| |
| 11 | 11 | 0x54 ('T') |||||||| |
| 12 | 0 | RTD Header |||||||| |
| 13 | 1 | TYPE LENGTH = 0x03 |||||||| |
| 14 | 2 | PAYLOAD LENGTH = 0x06 |||||||| |
| 15 | 3 | TYPE (1/3) = 0x49 ('I') |||||||| |
| 16 | 4 | TYPE (2/3) = 0x44 ('D') |||||||| |
| 17 | 5 | TYPE (3/3) = 0x58 ('X') |||||||| 412 |
| 18 | 6 | SPECIFYING INDEX NUMBER |||||||| |
| 19 | 7 | DEVICE TYPE |||||||| |
| 20 | 8 | DATA LENGTH OF RECORD INFORMATION |||||||| |
| 21 | 9 | 0x49 ('F') |||||||| |
| 22 | 10 | 0x41 ('A') |||||||| |

FIG. 4C

| OFFSET | 7 | 6 | 5 | 4 | 3 | 2 | 1 | 0 | |
|---|---|---|---|---|---|---|---|---|---|
| 0 | RTD Header ||||||||  |
| 1 | TYPE LENGTH = 0x03 ||||||||  |
| 2 | PAYLOAD LENGTH = 0x06+(N-12) ||||||||  |
| 3 | TYPE (1/3) = 0x49 ('I') ||||||||  |
| 4 | TYPE (2/3) = 0x44 ('D') ||||||||  |
| 5 | TYPE (3/3) = 0x58 ('X') |||||||| ⎫ 421 |
| 6 | SPECIFYING INDEX NUMBER ||||||||  |
| 7 | DEVICE TYPE ||||||||  |
| 8 | DATA LENGTH OF RECORD INFORMATION ||||||||  |
| 9 | 0x57 ('W') ||||||||  |
| 10 | 0x50 ('P') ||||||||  |
| 11 | 0x54 ('T') ||||||||  |
| 12 ⋮ N | STATIC INFORMATION FOR WIRELESS POWER TRANSMISSION |||||||| ⎫ 422 |

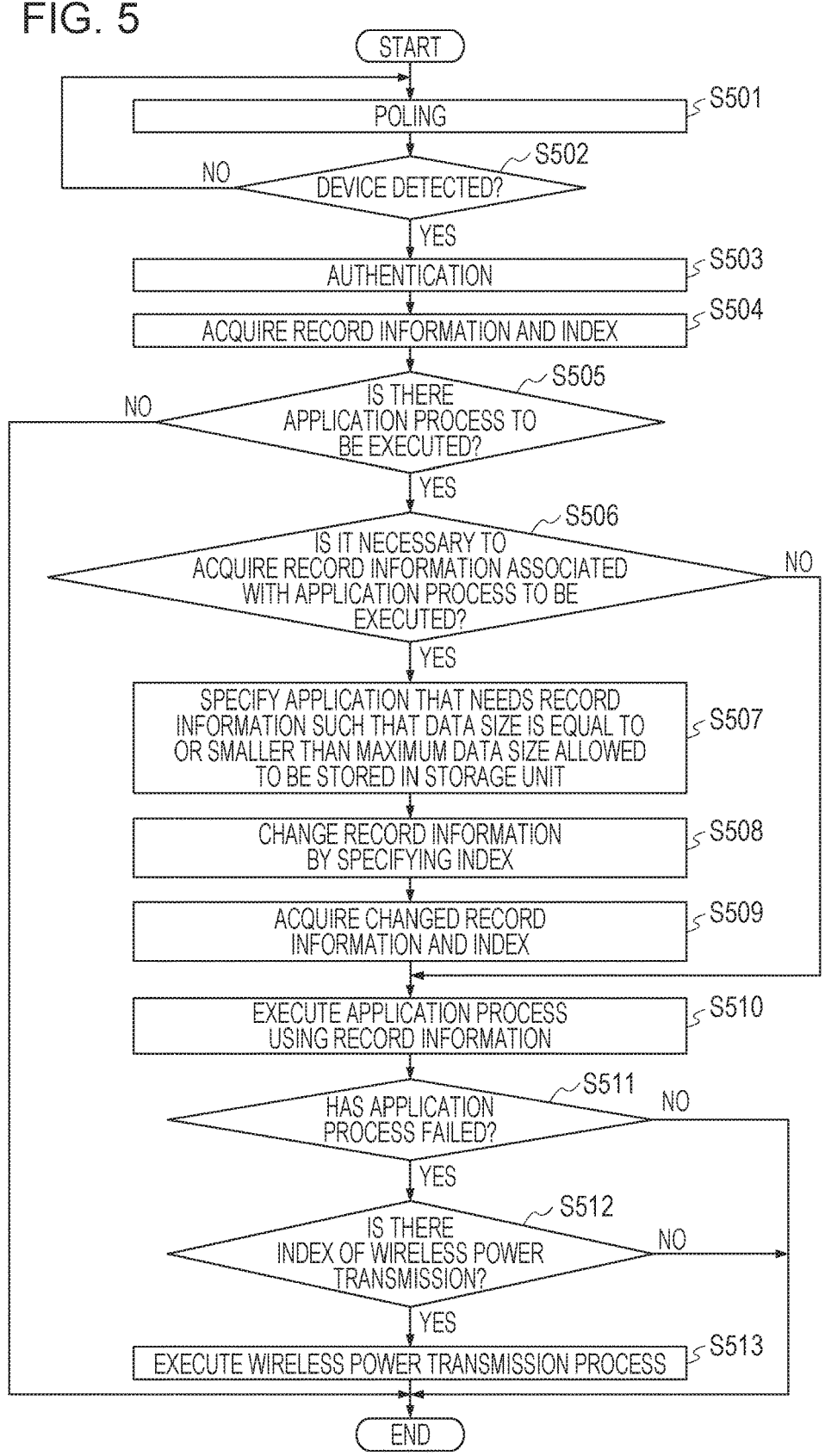

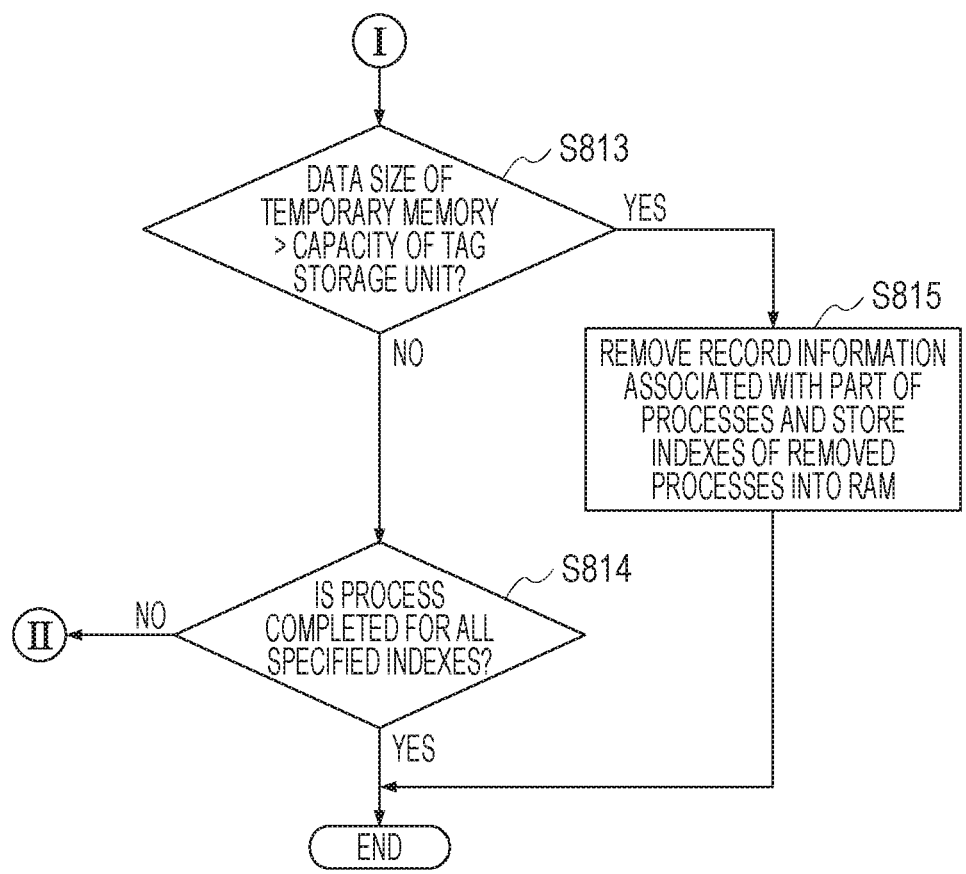

ELECTRONIC DEVICE CAPABLE OF PERFORMING WIRELESS COMMUNICATION, METHOD OF CONTROLLING THE ELECTRONIC DEVICE, AND PROGRAM

BACKGROUND

Field

Aspects of the present disclosure generally relate to an electronic device capable of performing wireless communication.

Description of the Related Art

In recent years, electronic devices have been available that include a contactless close proximity wireless communication function such as Near Field Communication (NFC) or Radio Frequency Identification (RFID). In close proximity wireless communication, communication is performed between a reader/writer located at one side and an NFC tag located at the other side. In the communication, the reader/writer actively reads out data from an internal memory of the NFC tag or writes data into the internal memory of the NFC tag.

The close proximity wireless communication function is implemented in many portable terminals such as digital cameras, portable telephones, and the like. For example, Japanese Patent Laid-Open No. 2011-151746 discloses a technique where parameters for Wi-Fi® connection are shared using NFC, thereby making it unnecessary for a user to manually input Wi-Fi® parameters. Some NFC tags installed in such devices allow a CPU of a device to access an internal memory of a NFC tag to rewrite information stored in the internal memory.

In NFC or RFID described above, two devices communicating with each other have their own roles, that is, a target and an initiator. One of features of NFC or RFID is that a device serving as an initiator (reader/writer) is allowed to supply power to a device serving as a target (NFC tag). This enables implementation of a target in a device with no power supply installed therein, such as a seal, a card, or the like. In a case where a target device has its own power supply, it is possible to charge this power supply with power supplied from an initiator device. For example, Japanese Patent Laid-Open No. 2014-75934 discloses a technique in which power is wirelessly supplied using NFC.

However, in general, the internal memory of the NFC tag does not have a sufficiently large enough capacity to store parameters associated with a plurality of services at the same time. Therefore, it is not allowed to read out parameters associated with a plurality of services by performing a close-proximity operation only once, and thus it is difficult, depending on the situation, to smoothly acquire information associated with a desired service. It may be possible to read out information associated with a plurality of services such that reading out of information is performed repeatedly while rewriting the tag when the target device and the initiator devices are in proximity, thereby making it possible to read out the information by performing a close proximity operation substantially once. However, to rewrite the NFC tag, it is necessary that the internal CPU is in operation. Thus there is a possibility that when the remaining battery capacity is not sufficiently high, and thus impossible to rewrite the NFC tag, the low remaining battery capacity does not allow it to change the service mode to a mode in which power is supplied wirelessly. Also in this case, it is difficult to smoothly read out information associated with a desired service.

SUMMARY

According to an aspect of the present disclosure, an electronic device configured to communicate with a communication apparatus includes a connection unit configured to connect to a battery, a storage unit accessible from an external apparatus via a close proximity wireless communication, and a control unit configured to perform control such that information used in executing one of a plurality of functions including a wireless power transmission function is stored in the storage unit, wherein the control unit performs the control such that information associated with the wireless power transmission function is stored in the storage unit depending on a charge status of the battery.

Further features of aspects of the present invention will become apparent from the following description of exemplary embodiments with reference to the attached drawings.

BRIEF DESCRIPTION OF THE DRAWINGS

FIGS. 4A to 4C are diagrams each illustrating an example of a configuration in which indexes are described according to an embodiment.

FIG. 5 is a flow chart illustrating an overall processing flow of a communication apparatus according to an embodiment.

FIGS. 8A and 8B are flow charts illustrating a process performed to change an index specified by a communication apparatus to record information according to an embodiment.

DESCRIPTION OF THE EMBODIMENTS

Embodiments of the present disclosure are described in detail below with reference to accompanying drawings.

Note that embodiments described below are merely examples of implementations of the present disclosure, and embodiments or changes may be possible depending on configuration and/or various other factors of an apparatus. Also note that embodiments may be properly combined.

First Embodiment

System Configuration

Figure 1:
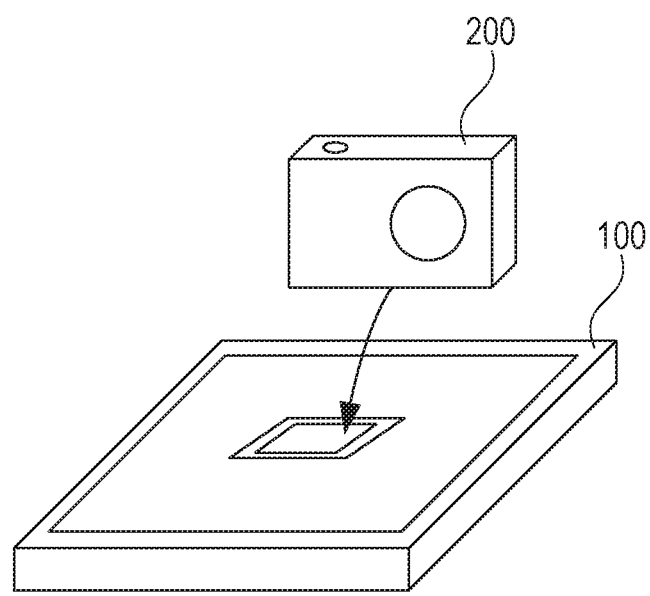
FIG. 1 is a diagram illustrating an example of a system according to an embodiment.

FIG. 1 illustrates a configuration of a communication system according to an embodiment. In the present embodiment, the communication system includes a communication apparatus 100 which may be, for example, a NFC reader/writer apparatus, and an electronic device 200 which may be, for example, a digital camera or the like. The communication apparatus 100 has a function of wireless communication such as wireless LAN, Bluetooth (registered trademark), or the like, a function of close proximity wireless communication such as NFC, and a function of wireless power transmission. The electronic device 200 has a function of wireless communication such as wireless LAN, Bluetooth (registered trademark), or the like, a function of wired communication such as wired LAN or the like, a function of close proximity wireless communication such as NFC or the like, and a function of receiving power in wireless power transmission.

Configuration of Each Apparatus

Figure 2:
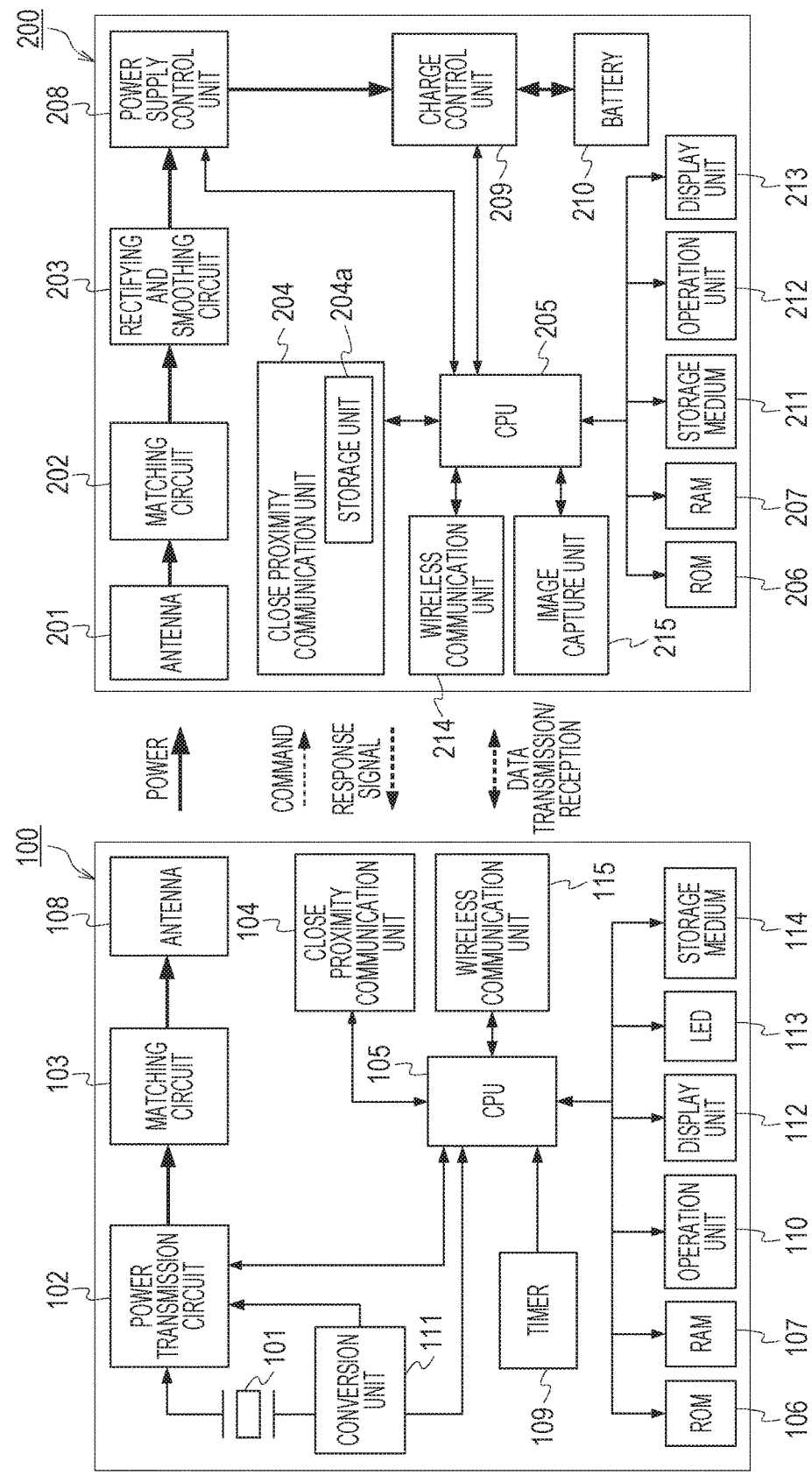
FIG. 2 is a block diagram illustrating an example of a configuration of a communication apparatus and that of an electronic device according to an embodiment.

FIG. 2 is a block diagram of the communication apparatus 100 and that of the electronic device 200. First, the communication apparatus 100 is described below.

An oscillator 101 is driven by power supplied from an AC power supply (not illustrated) via a conversion unit 111 and generates a signal with a frequency used to control a power transmission circuit 102. The oscillator 101 may be realized using a crystal oscillator or the like.

The power transmission circuit 102 generates, in accordance with the power supplied from the conversion unit 111 and the oscillation frequency of the oscillator 101, power to be supplied to the electronic device 200 via the antenna 108. The power transmission circuit 102 internally includes a FET and the like and generates power to be supplied to the electronic device 200 by controlling a current flowing between the source and the drain of the FET by controlling the voltage of the gate of the internal FET according to the oscillation frequency of the oscillator 101. The power generated by the power transmission circuit 102 is supplied to a matching circuit 103. Note that the power transmission circuit 102 is capable of both changing the magnitude of the power output from the FET and stopping generation of the power by controlling the gate voltage of the internal FET.

The matching circuit 103 is a resonance circuit that allows the antenna 108 and a capacitor to resonate at a resonance frequency f depending on the oscillation frequency of the oscillator 101. The resonance frequency f may be equal to the commercial frequency, that is, 50 or 60 Hz, or may be within a range from 10 to several hundred kHz, or may be equal to a frequency of about 10 MHz.

The power, generated by the power transmission circuit 102 in a state in which the oscillation frequency of the oscillator 101 is set to the resonance frequency f, is supplied to the antenna 108 via the matching circuit 103.

A close proximity wireless communication unit 104 is a hardware block including a communication processing circuit for performing close proximity wireless communication and an antenna. The close proximity wireless communication unit 104 performs a communication process, for example, according to the NFC standard or the like. Note that the antenna 108 for supplying power may also be used for communication.

A central processing unit (CPU) 105 controls various parts in the communication apparatus 100 by using the power supplied from a not-illustrated AC power supply via the conversion unit 111. The CPU 105 also controls operations of various parts of the communication apparatus 100 by executing a computer program stored in a read only memory (ROM) 106. The CPU 105 controls the power supplied to the electronic device 200 by controlling the power transmission circuit 102. Furthermore, the CPU 105 communicates with the electronic device 200 by controlling the close proximity wireless communication unit 104 and a wireless communication unit 115. The CPU 105 issues a device authentication request, a request to acquire charge information, or the like by controlling the close proximity wireless communication unit 104. The CPU 105 shares, with the electronic device 200, parameters for establishing the connection of the wireless communication unit 115 by controlling the close proximity wireless communication unit 104. Furthermore, by controlling the wireless communication unit 115, the CPU 105 communicates with the electronic device 200 to receive data such as image data, audio data, or the like stored in the storage medium 211 of the electronic device 200.

Furthermore, the CPU 105 controls the close proximity wireless communication unit 104 or the wireless communication unit 115 to acquire device information associated with the electronic device 200 and status information indicating the changing state of the electronic device 200. Hereinafter, information associated with a device will be referred to as "device information". The device information may include information indicating a device manufacturer name, information indicating a product name, information indicating a model number, information indicating a product ID, information indicating a serial number, and the like. The device information may further include information indicating whether the electronic device 200 is capable of performing data communication by operating the wireless communication unit 214 using only contactlessly supplied power. Information indicating the changing status of the electronic device 200 is referred to as "status information". The status information may include charge information of the electronic device 200, information indicating whether data stored in the storage medium 211 has been changed, and information indicating whether the close proximity wireless communication unit 204 is enabled or disabled. The status information may further include information indicating whether the wireless communication unit 214 is enabled or disabled, information indicating whether the storage medium 211 is inserted, information indicating whether the lid of the storage medium 211 is in a closed or open state, information indicating whether the battery 210 is installed, information indicating whether the lid of the battery 210 is in a closed or open state, and the like. The charge information will be described in further detail later.

The ROM 106 stores computer programs for controlling operations of various parts of the communication apparatus 100 and also stores information such as parameters associated with the operations of the various parts. The ROM 106 also stores image data to be displayed on the display unit 112.

A random access memory (RAM) 107 is a rewritable volatile memory, and is used to temporarily store computer programs for controlling operations of various parts of the communication apparatus 100, information such as parameters associated with the operations of the various parts, information received from the electronic device 200 via the close proximity wireless communication unit 104, and other information.

The antenna 108 is an antenna for outputting the power generated by the power transmission circuit 102. The communication apparatus 100 supplies power to the electronic device 200 via the antenna 108.

A timer 109 performs a time measurement to get the current time or to control operations or processes performed by various parts. Threshold values associated with times measured by the timer 109 are stored in advance in the ROM 106.

The operation unit 110 provides a user interface for operating the communication apparatus 100. The operation unit 110 includes a power button of the communication apparatus 100, a button for switching the mode of the communication apparatus 100, and the like. Each button may be realized by a switch, a touch panel, or the like. The CPU 105 controls the communication apparatus 100 according to a command input, via the operation unit 110, by a user. Note that the operation unit 110 may control the communication apparatus 100 in accordance with a remote control signal received from a not-illustrated remote control.

When the communication apparatus 100 is in a state in which the communication apparatus 100 is connected to the not-illustrated AC power supply, the conversion unit 111 converts AC power supplied from the non-illustrated AC power supply to DC power and supplies the resultant DC power over the entire communication apparatus 100.

The display unit 112 is a display unit for displaying a display content generated by the CPU 105. For example, the display unit 112 includes a liquid crystal panel, an organic electroluminescent (EL) panel, or a similar device and a control unit for controlling the panel.

A light emitting diode (LED) 113 emits light under the control of the CPU 105 to notify a user that communication is being performed using the close proximity wireless communication unit 104 or that power is being output using the power transmission circuit 102.

The storage medium 114 is a storage medium for storing data such as image data, audio data, and the like. The storage medium 114 may be a flash memory, a hard disk drive (HDD), or the like, or the storage medium 114 may be a removable flash memory.

The wireless communication unit 115 includes a communication processing circuit and an antenna to perform wireless communication. The wireless communication unit 115 is a processing block configured to perform a communication process according to a standard such as the wireless Local Area Network (LAN) 802.11a/b/g/n/ac/ad standard, the Long Term Evolution (LTE) standard, or the like. In the present embodiment, the wireless communication unit 115 is capable of participating in a network generated by an external access point, and is also capable of generating a network by transmitting a beacon from the wireless communication unit 115.

Next, the electronic device 200 is described below. In the following description, it is assumed by way of example that the electronic device 200 is a digital still camera.

An antenna 201 is an antenna for receiving power supplied from the communication apparatus 100. The electronic device 200 receives power from the communication apparatus 100 via the antenna 201.

A matching circuit 202 is a resonance circuit configured to provide impedance matching to allow the antenna 201 to resonate at the same frequency as the resonance frequency f of the communication apparatus 100. The matching circuit 202 includes, as with the matching circuit 103, a capacitor, a coil, a resistor, and the like. The matching circuit 202 allows the antenna 201 to resonate at the same frequency as the resonance frequency f of the communication apparatus 100. The matching circuit 202 supplies the power received via the antenna 201 to a rectifying-and-smoothing circuit 203. The matching circuit 202 uses a part of the power received via the antenna 201 to transmit a request in an AC form to the close proximity wireless communication unit 204.

The rectifying-and-smoothing circuit 203 removes the request and noise from the power received via the antenna 201 and generates DC power. The rectifying-and-smoothing circuit 203 supplies the generated DC power to a power control unit 208. The rectifying-and-smoothing circuit 203 includes one or more rectifying diodes thereby generating DC power by full-wave rectification or half-wave rectification. The DC power generated by the rectifying-and-smoothing circuit 203 is supplied to the power control unit 208.

The close proximity wireless communication unit 204 is a hardware block including a communication processing circuit for performing close proximity wireless communication and an antenna. The close proximity wireless communication unit 204 performs a communication process, for example, according to the NFC standard or the like. Note that the antenna 201 for receiving power may also be used for communication. The close proximity wireless communication unit 204 includes a storage unit 204a which is a nonvolatile memory for storing data. The storage unit 204a is capable of being accessed by the CPU 205 to read/write data. The storage unit 204a is also capable of being accessed by the communication apparatus 100 via NFC communication. The storage unit 204a is managed based on addresses such that the CPU 205 or the communication apparatus 100 is allowed to read or write data by specifying an address to be accessed and a data size. When the storage unit 204a is accessed by the communication apparatus 100, the CPU 205 receives an interrupt notification.

The CPU 205 controls operations of various parts of the electronic device 200 by executing computer programs stored in a ROM 206 Furthermore, the CPU 205 supplies power received from the communication apparatus 100 to various parts of the electronic device 200 and charges a battery 210 by controlling the power control unit 208 and a charge control unit 209. Furthermore, the CPU 205 performs a communication process by controlling the close proximity wireless communication unit 204 and the wireless communication unit 214. When a device authentication request or a request to acquire charge information is received from the communication apparatus 100, the CPU 205 returns a response via the close proximity wireless communication unit 204. Furthermore, the CPU 205 establishes a connection of the wireless communication unit 214 by controlling the close proximity wireless communication unit 204, and the CPU 205 performs transmission of data such as image data, audio data, or the like stored in the storage medium 211 to the communication apparatus 100 by controlling the wireless communication unit 214.

The ROM 206 stores computer programs for controlling operations of various parts of the electronic device 200 and also stores information such as parameters associated with the operations of the various parts. The ROM 206 also stores device information.

A RAM 207 is a rewritable volatile memory, and is used to temporarily store computer programs for controlling operations of various parts of the electronic device 200, information such as parameters associated with the operations of the various parts, information received from the communication apparatus 100, and/or the like.

The power control unit 208 is realized using a switching regulator, a linear regulator, or the like, and supplies DC power supplied from the rectifying-and-smoothing circuit 203 or a not-illustrated external power supply to the charge control unit 209 and to the entire electronic device 200.

In a case where power is supplied from the power control unit 208, the charge control unit 209 charges the battery 210 depending on the received power. It is assumed by way example that the charge control unit 209 charges the battery 210 with a constant voltage and a constant current. The charge control unit 209 periodically detects information in terms of charging of the mounted battery 210, and supplies the detected information to the CPU 205.

The CPU 205 stores charge information indicating a battery status in the RAM 207.

The battery 210 is a battery capable of removably attached to the electronic device 200. The battery 210 is a rechargeable secondary battery such as a lithium-ion battery or the like. The battery 210 is capable of supplying power to various parts of the electronic device 200. On the other hand, in a case where power from the power control unit 208 is not supplied, the battery 210 supplies power to various parts of the electronic device 200. For example, in a case where first power output for communication from the communication apparatus 100 is set to be low, or in a case where power supplied from the communication apparatus 100 is stopped, the battery 210 supplies power to various parts of the electronic device 200. There is a lid for the battery 210, and a status of the lid in terms of whether the lid is in a closed or open state is notified to the CPU 205.

The storage medium 211 is a storage medium for storing data such as image data, audio data, and the like. The storage medium 211 may be a flash memory, an HDD, or the like, or the storage medium 211 may be a removable flash memory. In a case where the storage medium 211 is of a removable attachable type, there is a lid for the storage medium 211, and a status of the lid in terms of whether the lid is in a closed or open state is notified to the CPU 205. Note that when data stored on the storage medium 211 is updated, the CPU 205 changes data update information, which is one of status information, to an "updated" state to indicate that the data has been updated. More specifically, updating of data occurs, for example, when a new content is stored which is capable of being transmitted to the communication apparatus 100. In this case, the data update information is changed to the "updated" state. In a case where updated data has been completely transferred from the storage medium 211 to the communication apparatus 100, the CPU 205 changes the data update information to a "not updated" state That is, the data update information is used to indicate whether or not there is some data that has not yet been transmitted to the communication apparatus 100.

An operation unit 212 provides a user interface for operating the electronic device 200. The operation unit 212 includes a power button for turning on/off the electronic device 200 and a mode switching button for switching the mode of the electronic device 200, and the like. Each button may be realized by a switch, a touch panel, or the like. The CPU 205 controls the electronic device 200 according to a command input, via the operation unit 212, by a user. The operation unit 212 may control the electronic device 200 in accordance with a remote control signal received from a not-illustrated remote control. The operation unit 212 allows a user to make setting, via a menu screen displayed on the display unit 213, as to whether the close proximity wireless communication unit 204 or the wireless communication unit 214 is enabled or disabled.

The display unit 213 includes a liquid crystal panel, an organic EL panel, or the like and is used to display an operation screen, a captured image, or the like under the control of the CPU 205. The display unit 213 may be realized in a movable form such as a variable angle form. In this case, position information of the display unit 213 is transmitted in digital form to the CPU 205.

The wireless communication unit 214 includes a communication processing circuit and an antenna to perform wireless communication. The wireless communication unit 214 is a processing block configured to perform a communication process according to a standard such as the wireless Local Area Network (LAN) 802.11a/b/g/n/ac/ad standard, the LTE standard, or the like. In the present embodiment, the electronic device 200 is capable of communicating, using the wireless communication unit 214, with the communication apparatus 100, for example, via a network generated by an external access point. The electronic device 200 is also capable of communicating with the communication apparatus 100 by participating in a network generated by the wireless communication unit of the communication apparatus 100.

An image capture unit 215 is a processing block including an optical lens, a CMOS sensor, a digital image processing unit, and the like, thereby capturing an image by converting an analog signal input via the optical lens to digital data. The image acquired by the image capture unit 215 is temporarily stored in the RAM 207 and is processed under the control of the CPU 205. Examples include storing the image into the storage medium 211, transmitting the image to an external device via the wireless communication unit 214, and the like. The image capture unit 215 also includes a lens controller to control zooming, focusing, aperture adjustment, and the like under the control of the CPU 205.

Note that the antenna 108 and the antenna 201 each may be a helical antenna, a loop antenna, or a panel antenna such as a meander line antenna or the like.

Note that the process performed by the communication apparatus 100 according to the present embodiment may also be applied to a system in which the communication apparatus 100 supplies power wirelessly to the electronic device 200 by using electromagnetic coupling. Similarly, the process performed by the electronic device 200 according to the present embodiment may also be applied to a system in which the communication apparatus 100 supplies power wirelessly to the electronic device 200 by using electromagnetic coupling.

Furthermore, the present embodiment may also be applied to a system in which an electrode serving as the antenna 108 is formed on the electronic device 100 and an electrode serving as the antenna 201 is formed on the electronic device 200 and the communication apparatus 100 supplies power to the electronic device 200 by electric field coupling.

Furthermore, the process performed by the communication apparatus 100 and the process performed by the electronic device 200 may be applied to a system in which the communication apparatus 100 supplies power wirelessly to the electronic device 200 by electromagnetic induction.

In the present embodiment, it is assumed by way of example that the communication apparatus 100 transmits power wirelessly to the electronic device 200, and the electronic device 200 contactlessly receives the power from the communication apparatus 100. Note that "contactlessly" may be read as "wirelessly", or "with no contact".

Record Information and Index

Next, an example is described below referring to FIGS. 3A and 3B as to a data configuration of record information and an index stored in the storage unit 204a of the close proximity wireless communication unit 204 of the electronic device 200.

The record information is information including all information needed in executing a particular application using NFC communication (note that herein such information is referred to simply as "record information"). The index is information indicating existence of record information associated with an application, and is used to identify an application process. Unlike the record information, the index does not include all information needed in executing the particular application. However, the index may include part of all information to make it possible to perform the minimum required process (for example, information for acquiring all information needed in executing the entire process).

In the present embodiment, the record information and the index are represented in a data format, for example, according to the Record Type Definition (RTD) of the NFC standard.

Figure 3A:
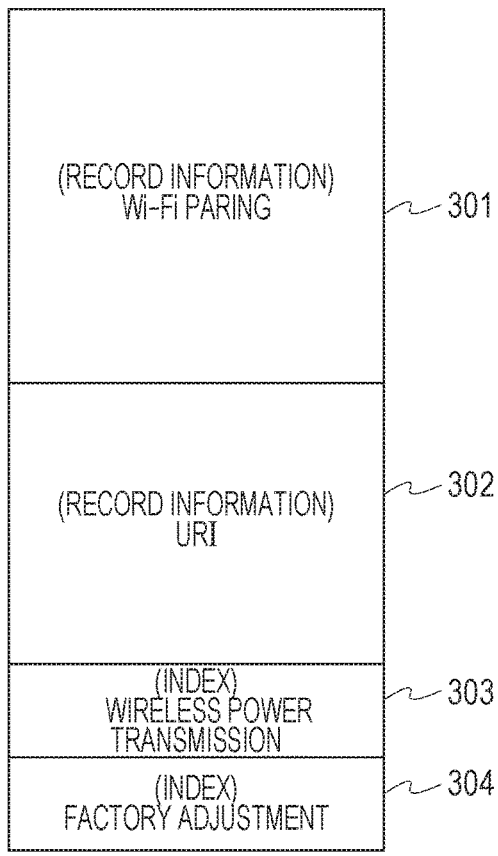
FIGS. 3A and 3B are diagrams each illustrating an example of a configuration in which record information and indexes are stored in a close proximity wireless communication unit of an electronic device according to an embodiment.

FIG. 3A shows an example in which various parameters (Wi-Fi paring parameters) for establishing Wi-Fi communication and information (URI information) associated with an application process of accessing particular URI are described as record information. As for indexes, information (wireless power transmission information) associated with an application process of transmitting information on wireless power transmission by NFC communication and information (factory adjustment information) in terms of adjustment made at a factory are described.

With the configuration described in FIG. 3A, the communication apparatus 100 is capable of performing an application process using information associated with the Wi-Fi paring 301 and the URI 302 included in the information acquired via the NFC communication. The communication apparatus 100 gets to know that in the electronic device 200, record information in terms of the wireless power transmission 303 and the factory adjustment 304 are stored not in the storage unit 204a but in another internal memory. This makes it possible to, if necessary, change the record information stored in the storage unit 204a by specifying an index such that the record information stored in the storage unit 204a is changed to information associated with the process corresponding to the specified index. Note that the record information includes an index number of the corresponding process. When the record information is changed to another record information by specifying an index, if it is desired to hold the previous record information, an index number of the record information to be held is also specified. That is, the information necessary in performing the process corresponding to the specified index number is described as record information in the storage unit 204a, while IDs of the other processes are stored as indexes in the storage unit 204a.

Figure 3B:
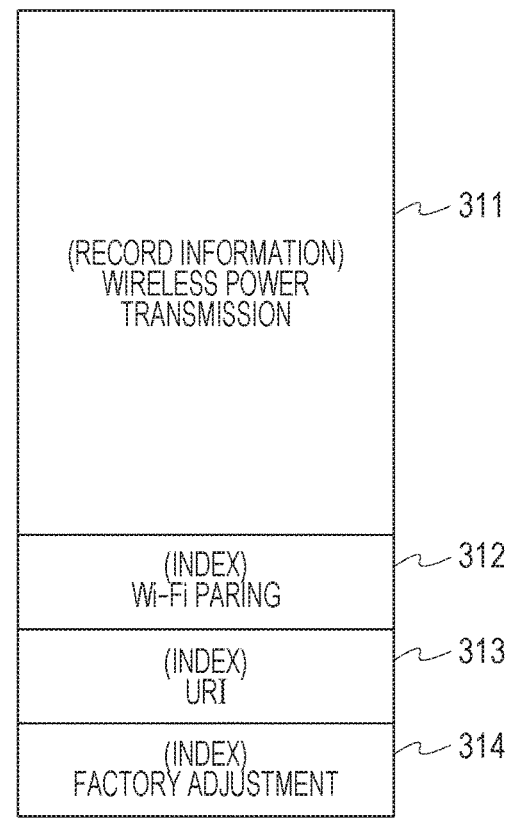

FIG. 3B shows an example in which record information in terms of an application process of wireless power transmission 311 is stored in the storage unit 204a, and indexes of Wi-Fi paring 312, URI 313, and factory adjustment 314 are stored in the storage unit 204a. Thus, with the configuration shown in FIG. 3B, the communication apparatus 100 is capable of performing an application process using information associated with the wireless power transmission 311 included in the information acquired via the NFC communication. Furthermore, the communication apparatus 100 gets to know that the electronic device 200 has record information in terms of the Wi-Fi paring 312, the URI 313, and the factory adjustment 314, and thus the communication apparatus 100 is capable of, if necessary, acquiring such record information by specifying an index thereof. That is, it is possible to change the record information stored in the storage unit 204a to another record information corresponding to the specified index.

Configuration of Index

An example of a RTD configuration of an index stored in the storage unit 204a of the close proximity wireless communication unit 204 is described below with reference to FIGS. 4A to 4C.

FIG. 4A illustrates an example of a configuration in which there is an RTD indicating that the record type is "index" and each index is described therein.

In FIG. 4A, 401 denotes RTD information representing all index information including individual indexes. The RTD information 401 includes "RTD Header" information which is header information, "Type Length" indicating the length of "Type" information, and "Payload Length" indicating the payload length of the entire index information. The "RTD Header" information, "Type Length", and "Payload Length" are also included in each RTD described below. They are similar to those described above, and thus a further description thereof is not given below. The RTD information 401 further includes "Type" information indicating that the type is "IDX", i.e., index, and a field for receiving an index number specified by the communication apparatus 100. The index number is described such that each bit thereof is assigned a number. For example, a 0th bit may be assigned to an index number 0, a 1st bit may be assigned to an index number 1, and so on. Thus, it is possible to specify a plurality of indexes at the same time. In this example, the field for receiving the index number specified by the communication apparatus 100 has a length of 1 byte. However, there is no particular restriction on the length of this field, and thus the length may be two bits or longer.

An area 402 in FIG. 4A, describes detailed information included in 401. In this example, information "WPT" indicating an index of a process of "wireless power transmission" is described in "Type" fields. This area 402 further includes an index number of an index "WPT", device information used by the communication apparatus 100 to identify the device, and information indicating a data length of record information.

An area 403 describes details of information included in the RTD information 401 such that information "FA" indicating an index of a process "factory adjustment" is described in "Type" fields. This area 403 further includes an index number of the index "FA", device information used by the communication apparatus 100 to identify the device, and information indicating a data length of record information.

FIG. 4B illustrates an example of a configuration in which there are RTD's each indicating an index. However, unlike the example shown in FIG. 4A, this configuration does not include information indicating all index information such as 401 in FIG. 4A. Although not shown, when an index is specified, it is necessary to further provide a field in each record information to specify whether existing record information is retained or existing record information is deleted and an index of the deleted record information is stored.

In FIG. 4B, 411 denotes data of an index of wireless power transmission. The data 411 includes "RTD Header" information which is header information, "Type Length" indicating the length of "Type" information, and "Payload Length" indicating the payload length of the index. The data 411 further includes "Type" information indicating that the type is "IDX", i.e., index, and a field for receiving an index number specified by the communication apparatus 100. The data 411 further includes device information used by the communication apparatus 100 to identify the device, information indicating a data length of record information, and a character string "WPT" indicating the index of the process of "wireless power transmission".

In FIG. 4B, 412 denotes data of an index of factory adjustment. The data 412 includes "RTD Header" information which is header information, "Type Length" indicating the length of Type information, and "Payload Length" indicating the payload length of the index. The data 412 further includes "Type" information indicating that the type is "IDX", i.e., index, and a field for receiving an index number specified by the communication apparatus 100. This area 402 further includes device information used by the communication apparatus 100 to identify the device, information indicating a data length of record information, and a character string of information "FA" indicating the index of the process of "factory adjustment".

FIG. 4C illustrates an example in which RTD indicating an index includes minimum required information. As for a particular process such as wireless power transmission that needs to be performed even in a situation in which there is no remaining battery capacity, there is a possibility that it is impossible to change record information by using an index because the changing of recording information is performed under the control of the CPU 105. That is, it is impossible to change the record information unless the power supply is in an on-state. Therefore, as for the wireless power transmission, minimum required information for the index is described.

In FIG. 4C, data 421 has the same configuration as that of the data 411, and indicates an index of wireless power transmission.

Data 422 is minimum required data added to the index of the wireless power transmission, More specifically, the data 422 includes an available level of received power, version information of a supported protocol, and the like.

Operation of Communication Apparatus

FIG. 5 is a flow chart illustrating an operation of the communication apparatus 100 according to the present embodiment. Note that the operation shown in this flow chart is performed by executing a program stored in the ROM 106. This process shown in the flow chart is started when the power of the communication apparatus 100 is turned on.

In S501, the CPU 105 transmits a poling request to periodically detect a device by controlling the close proximity wireless communication unit 104. For example, in a case where NFC communication is used, a SENS_REQ command or the like is transmitted.

In S502, the CPU 105 determines whether a device has been detected. More specifically, by controlling the close proximity wireless communication unit 104, it is determined whether a response to the request transmitted in S501 is received from the electronic device 200. In a case where a SENS_RES response is received, the CPU 105 determines that there is a device. In a case where the CPU 105 determines that a device is detected (YES in S502), the processing flow proceeds to S503. In a case where the CPU 105 determines that no device is detected (NO in S502), the processing flow returns to S501 to repeat a device detection process.

In S503, the CPU 105 performs an authentication process by controlling the close proximity wireless communication unit 104. In this authentication process, the CPU 105 acquires the storage capacity of the storage unit 204a of the electronic device 200.

In S504, the CPU 105 reads out, by controlling the close proximity wireless communication unit 104, record information and index data stored in the storage unit 204a of the close proximity wireless communication unit 204 of the electronic device 200.

In S505, the CPU 105 determines an application process to be executed based on the record information and the index data read out in S504. Note that there may be a plurality of application processes to be executed. Alternatively, a list of possible application processes may be displayed on a display unit based on the record information and the index data, and a user may select a process to be executed from the list. In a case where the CPU 105 determines, based on the record information and the index data, that there is a process to be executed (YES in S505), and the processing flow proceeds to S506. In a case where the CPU 105 determines, based on the record information and the index data, that there is no process to be executed (NO in S505), the process shown in the flow chart is ended. Note that having no process to be executed may occur, for example, when a process of wirelessly supplying power is specified in a situation in which the electronic device 200 is in a fully charged state, or when there is no possible process. To perform the determination described above, the status of the electronic device 200 is also acquired, and the determination as to the process to be executed is performed depending on the status.

In S506, the CPU 105 determines whether it is necessary to acquire record information associated with the application process determined in S505 to be executed. In a case where the application process which is determined in S505 to be executed is an application process pointed to by an index, the record information thereof has not been read out in S504. Therefore, in this case, it is determined that it is necessary to acquire record information. On the other hand, in a case where the application process which is determined in S505 to be executed is not such an application process pointed to by an index, the record information thereof has already been read out in S504. Therefore, in this case, it is determined that it is not necessary to acquire record information. Therefore, in a case where there is even one of application processes to be executed is such an application process pointed to by an index (YES in S506), the processing flow proceeds to S507. In the case where any application process to be executed is not such an application process pointed to by an index (NO in S506), that is, in the case where the record information thereof has already been acquired, the processing flow proceeds to S510 without performing S507 and S508.

In S507, the CPU 105 detects the data length of the record information pointed to by the index shown in FIGS. 4A to 4C, and determines whether the record information, to be acquired, of the process pointed to by the index has a data size allowed to be stored in the storage unit 204a. Note that in a case where there is only one application process of interest, the record information thereof can be stored in the storage unit 204a. Therefore, the present step may be performed only when it is determined that a plurality of application processes is to be executed, that is, when it is necessary to store a plurality of pieces of record information in the storage unit 204a.

In a case where the CPU 105 determines that the data size is larger than is allowed to be stored in the storage unit 204a, an index is selected according to priority levels predetermined by the program for the application processes such that the total data size becomes equal to or smaller than the maximum value allowed to be stored in the storage unit 204a. That is, indexes are selected such that, of the application processes determined to be executed, those application processes with low priority levels are not selected.

In S508, the CPU 105 controls the close proximity wireless communication unit 104 to access an index field of the storage unit 204a to specify the index determined in S507, and send a command to the storage unit 204a to store the record information pointed to by the index determined in S507. As a result, in the electronic device 200, the record information and the index are rewritten according to the received command. For example, in a case where indexes pointing to "Wi-Fi paring" and "wireless power transmission" are specified, the electronic device 200 stores the record information of the "Wi-Fi paring" and the record information of "wireless power transmission" in the storage unit 204a. However, as for the other processes, indexes thereof are stored in the storage unit 204a.

In S509, by again controlling the close proximity wireless communication unit 104, the CPU 105 reads out the record information and the index data stored in the storage unit 204a of the close proximity wireless communication unit 204 of the electronic device 200. Note that the data read out here is the record information and the indexes rewritten in S508 by the electronic device 200.

Next, in S510, the CPU 105 executes, by controlling the close proximity wireless communication unit 104, the specific application process using the record information acquired from the electronic device 200. Note that in a case where it is necessary to perform a communication process using NFC in the application process, the necessary NFC process is performed by controlling the close proximity wireless communication unit 104. Note that the application processes may include the wireless power transmission process.

Next, in S511, the CPU 105 determines whether the application process executed in S510, except for the wireless power transmission process, has failed. In a case where the application process has failed (YES in S511), the processing flow proceeds to S512. In a case where the application process is successful (NO in S511), the process shown in the flow chart is ended.

In S512, the CPU 105 determines, from the record information and the indexes acquired in S504, whether the electronic device 200 has an index or record information of the wireless power transmission. In a case where it is determined that the electronic device 200 has an index or record information of the wireless power transmission (YES in S512), and the processing flow proceeds to S513. On the other hand, in a case where it is determined that the electronic device 200 does not have an index or record information of the wireless power transmission (NO in S512), the process shown in the flow chart is ended.

In S513, the CPU 105 performs the wireless power transmission process by controlling the power transmission circuit 102. Thereafter, the process shown in the flow chart is ended.

Operation of Electronic Device

Figure 6:
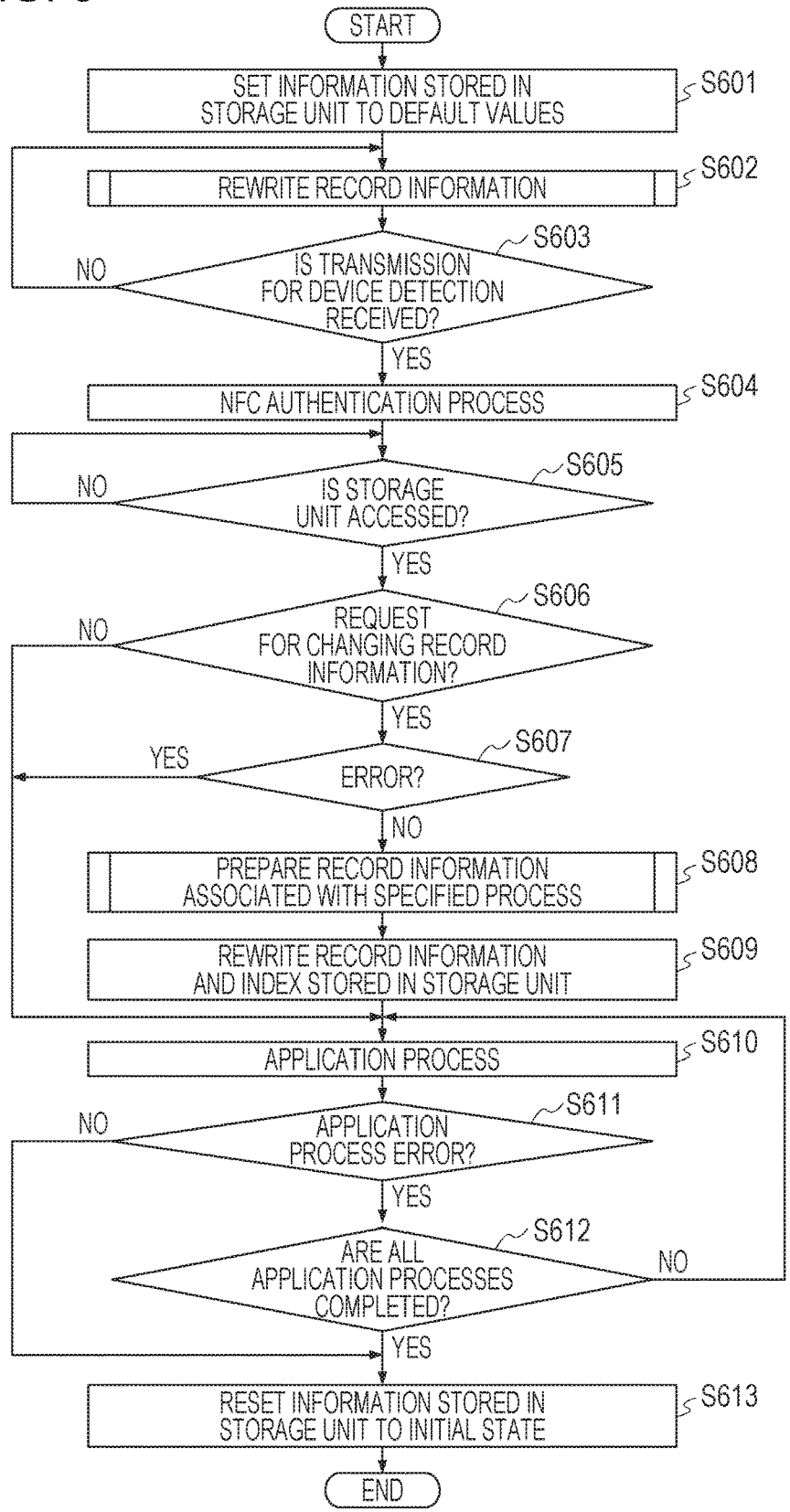
FIG. 6 is a flow chart illustrating an overall processing flow of an electronic device according to an embodiment.

FIG. 6 is a flow chart illustrating an overall processing flow of an operation of the electronic device 200 according to the present embodiment. Note that the operation shown in this flow chart is performed by executing a program stored in the ROM 206. Note that this control program is performed repeatedly.

In S601, the CPU 205 resets the record information and the index stored in the storage unit 204a into initial values.

In S602, the CPU 205 rewrites the record information and indexes. Details of this process will be described later with reference to FIG. 7.

In S603, the CPU 205 determines whether communication via the close proximity wireless communication unit 204 is received from the communication apparatus 100. More specifically, for example, it is determined whether a request such as a SENS_REQ request or the like transmitted from the communication apparatus 100 in S501 in FIG. 5 is received. In a case where communication from the communication apparatus 100 is received (YES in S603), the process proceeds to S604. In a case where communication from the communication apparatus 100 is not received (NO in S603), the processing flow returns to S602.

In S604, the CPU 205 performs an authentication process by controlling the close proximity wireless communication unit 204. In this authentication process, the storage capacity of the storage unit 204a is notified to the communication apparatus 100.

In S605, based on an interrupt notification from the close proximity wireless communication unit 204, the CPU 205 determines whether the storage unit 204a is accessed from the communication apparatus 100. In a case where the storage unit 204a is accessed (YES in S605), the processing flow proceeds to S606. In a case where the storage unit 204a is not accessed (NO in S605), the process in S605 is repeated.

In S606, the CPU 205 determines whether the interrupt notification received from the close proximity wireless communication unit 204 is of a record information change request (that is, specifying an index in S508). In a case where it is determined in S606 that the interrupt notification received from the close proximity wireless communication unit 204 is of a record information change request (YES in S606), the processing flow proceeds to S607. In a case where it is determined in S606 that the interrupt notification received from the close proximity wireless communication unit 204 is not of a record information change request (NO in S606), the processing flow proceeds to S610.

In S607, the CPU 205 checks whether any processing unit of the electronic device is in an error state. An error state may occur, for example, when the close proximity wireless communication unit 204 has not performed communication with the communication apparatus 100 over a predetermined period of time, when the lid for the storage medium 211 is in an open state, when the lid for the battery 210 is in an open state, when any of control units is in an abnormal state, or the like. In a case where some processing unit of the electronic device is in an error state, (YES in S607), the processing flow proceeds to S613. On the other hand, in a case where no processing unit of the electronic device is in an error state, (NO in S607), the processing flow proceeds to S608.

In S608, the CPU 205 prepares data for rewriting the current record information to record information of a process corresponding to an index specified by the communication apparatus 100. Details of this process will be described later with reference to FIGS. 8A and 8B.

Next, in S609, the CPU 205 writes, into the storage unit 204a, the data prepared and stored in the RAM 207 in S608.

In S610, the CPU 205 executes the application process of interest. Note that this application process executed here is that has been determined, by the communication apparatus 100 in S505 in FIG. 5, to be executed. In a case where it is necessary to perform the NFC communication process in the application process, the NFC process is performed by controlling the close proximity wireless communication unit 204. Note that it is assumed that the application processes includes a wireless power transmission process.

In S611, the CPU 205 determines whether the application process executed in S610 is successfully completed. The application process may fail, for example, when charging is stopped in the middle of the wireless power transmission process, when a communication error occurs in data transmission/reception after Wi-Fi paring is established, or when other errors occur. In a case where it is determined that an error has occurred during the application process (YES in S611), the processing flow proceeds to S612. On the other hand, in a case where it is determined that no error has occurred in the application process (NO in S611), the processing flow proceeds to S613.

In S612, the CPU 205 determines whether the execution is completed for all application processes. In a case where it is determined that the execution is completed for all application processes (YES in S612), the processing flow proceeds to S613. In a case where it is determined that the execution is not completed for all application processes, that is, when there is an application which is still in execution (NO in S612), the processing flow returns to S610 to continue the process.

In S613, the CPU 205 resets the record information and the index stored in the storage unit 204a to default values, and the process shown in the flow chart is ended.

Operation of Electronic Device

Figure 7:
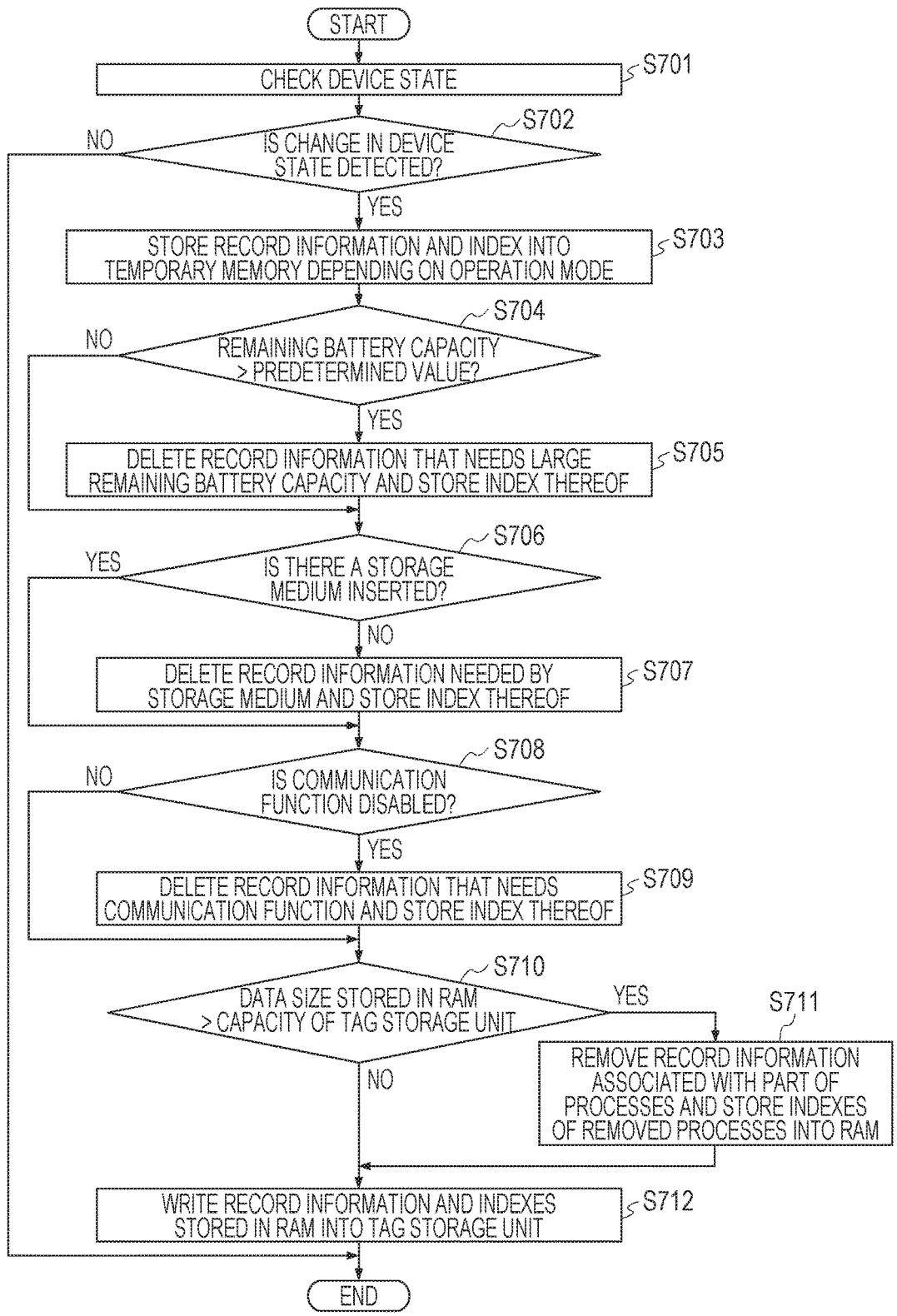
FIG. 7 is a flow chart illustrating a process performed to change record information and an index depending on state of an electronic device according to an embodiment.

FIG. 7 illustrates a flow chart of a processing flow performed by the CPU 205 of the electronic device 200 to change record information and an index depending on the state of the electronic device according to the present embodiment. Note that the operation shown in this flow chart is performed by executing a program stored in the ROM 206. Note that this flow chart shows details of the process in S602 in FIG. 6. However, the timing of performing this process is not limited to when S602 is performed, but the process may be performed periodically even in a situation in which the communication with the communication apparatus 100 is not yet established.

In S701, the CPU 205 checks the device status of each processing unit of the electronic device 200. More specifically, the checking is performed, for example, in terms of the menu setting state stored in the RAM 207, the state of charging the battery 210 by controlling the charge control unit 209 and the remaining battery capacity of the battery 210, the open/closed state of the lid for the battery 210, the state of the storage medium 211 as to whether the storage medium 211 is inserted or not, the open/closed state of the lid for the storage medium 211, the communication state of the wireless communication unit 214, the image capture operation state of the image capture unit 215, and/or the like. The CPU 205 stores, in the RAM 207, the device state of the electronic device 200 in terms of the states of the respective processing units.

In S702, the CPU 205 compares the state of each processing unit of the electronic device 200 acquired in S701 with the state thereof detected in the past to determine whether a change has occurred. In a case where it is determined that a change has occurred in the state of the electronic device 200 (YES in S702), the processing flow proceeds to S703. In a case where no change in the state of the electronic device 200 has occurred (NO in S702), the current process shown in the flow chart is ended, and the processing flow returns to the process shown in FIG. 6.

In S703, the CPU 205 stores record information and indexes in the RAM 207 depending on the current operation state such that record information associated with application processes capable of being executed are stored, while indexes are stored for the other processes. For example, when the electronic device 200 is in a playback mode, there is a possibility that a user wants to transmit an image being played to another apparatus. Thus, in the playback mode, record information associated with the Wi-Fi paring and the URI is stored, while, as for the factory adjustment, an index thereof is stored. In the case of an image capture mode, the consumption power is higher than in the playback mode, and thus necessity of charging the battery may occur more frequently than in the playback mode. Therefore, in the image capture mode, record information associated with the wireless power transmission is stored, while, as for the other processes, indexes thereof are stored. In the case of a manufacturer adjustment mode, record information associated with the factory adjustment is stored, while indexes are stored as to the other processes.

In S704, the CPU 205 checks, by controlling the charge control unit 209, whether the remaining battery capacity of the battery 210 is lower than a prescribed value. In a case where it is determined that the remaining battery capacity of the battery 210 is lower than the prescribed value (YES in S704), the processing flow proceeds to S705. On the other hand, in a case where it is determined that the remaining battery capacity of the battery 210 is equal to or higher than the prescribed value (NO in S704), the processing flow proceeds to S706.

In S705, the CPU 205 stores, in the RAM 207, indexes of application processes that need a sufficiently large remaining battery capacity, such as a Wi-Fi paring process or the like. If an index is already stored for a certain application process that needs a sufficiently large remaining battery capacity, the index is retained in the RAM 207. In a case where record information is already stored for a certain application process that needs a sufficiently large remaining battery capacity, the record information is deleted. The Wi-Fi paring process is an example of an application process that needs a sufficiently large remaining battery capacity.

In S706, the CPU 205 determines whether the storage medium 211 is inserted. In a case where it is determined that there is no inserted storage medium 211 (NO in S706), the processing flow proceeds to S707. On the other hand, in a case where it is determined that there is an inserted storage medium 211 (YES in S706), the processing flow proceeds to S708.

In S707, the CPU 205 stores, in the RAM 207, indexes of application processes needed in operation of the storage medium 211, such as the Wi-Fi paring process, the data transfer process, and the like. This is because when there is no inserted storage medium 211, it is not allowed to use service such as image sharing or the like even if a wireless communication function is enabled. That is, when there is no inserted storage medium 211, a user is unlikely to want immediate use of record information of an application process using the wireless communication function. If an index is already stored for an application process that needs the storage medium 211, this index is retained. If record information is already stored for an application process that needs the storage medium 211, such record information is deleted.

In S708, the CPU 205 determines whether the function of the wireless communication unit 214 is set to be disabled in the setting menu information stored in the RAM 207. In a case where it is determined that the function of the wireless communication unit 214 is set to be disabled (YES in S708), the process proceeds to S709. However, in a case where it is determined that the function of the wireless communication unit 214 is set to be enabled (NO in S708), the process proceeds to S710.

In S709, the CPU 205 stores, in the RAM 207, indexes of application processes that need the function of the wireless communication unit 214, such as the Wi-Fi paring process, the data transfer process, and the like. This is because when the wireless communication unit 214 is set to be disabled, a user is not likely to have an intention of immediately using the wireless communication function, and thus it is unlikely to become necessary to immediately use record information of the application processes using the wireless communication function. In a case where an index is already stored for an application process that needs the function of the wireless communication unit 214, such an index is retained. In a case where record information is already stored for an application process that needs the function of the wireless communication unit 214, such record information is deleted.

In S710, the CPU 205 determines whether the total data size of the record information and the indexes stored in the RAM 207 is larger than a maximum data size allowed to be stored in the storage unit 204*a*. In a case where it is determined that the total data size of the data stored in the RAM 207 is larger than the data size allowed to be stored in the storage unit 204*a* (YES in S710), the processing flow proceeds to S711. In a case where it is determined that the total data size of the data stored in the RAM 207 is equal to or smaller than the maximum data size allowed to be stored in the storage unit 204*a* (NO in S710), the processing flow proceeds to S712.

In S711, the CPU 205 deletes record information of an application process with a low priority level such that the total data size of the data stored in the RAM 207 is equal to or smaller than the maximum data size allowed to be stored in the storage unit 204*a*, and the CPU 205 stores, in the RAM 207, an index of the application process with the low priority level. The priority level of each application process is predetermined, and the determination is made according to the predetermined priority levels of the application processes.

In S712, the CPU 205 stores, in the storage unit 204*a*, the data including the record information and the indexes stored in the RAM 207.

Thereafter, the processing flow returns to the process shown in FIG. 6.

Note that device states are not limited to those described above with reference to FIG. 7. Examples of other device states include a state as to whether a battery is inserted or not, a state as to whether there is a newly captured image, a displaying state of the display unit, and the like. According to those device states, it may be allowed to determine application processes for which record information is stored, and application processes for which record information is not stored but indexes are stored.

As described above, depending on the status or setting of the electronic device 200, the determined is properly made as to for which application processes the record information is stored and for which application process, the indexes are stored. This makes it possible for the communication apparatus 100 to smoothly acquire information according to the user's intention.

Preparing Record Information

Figure 8A:
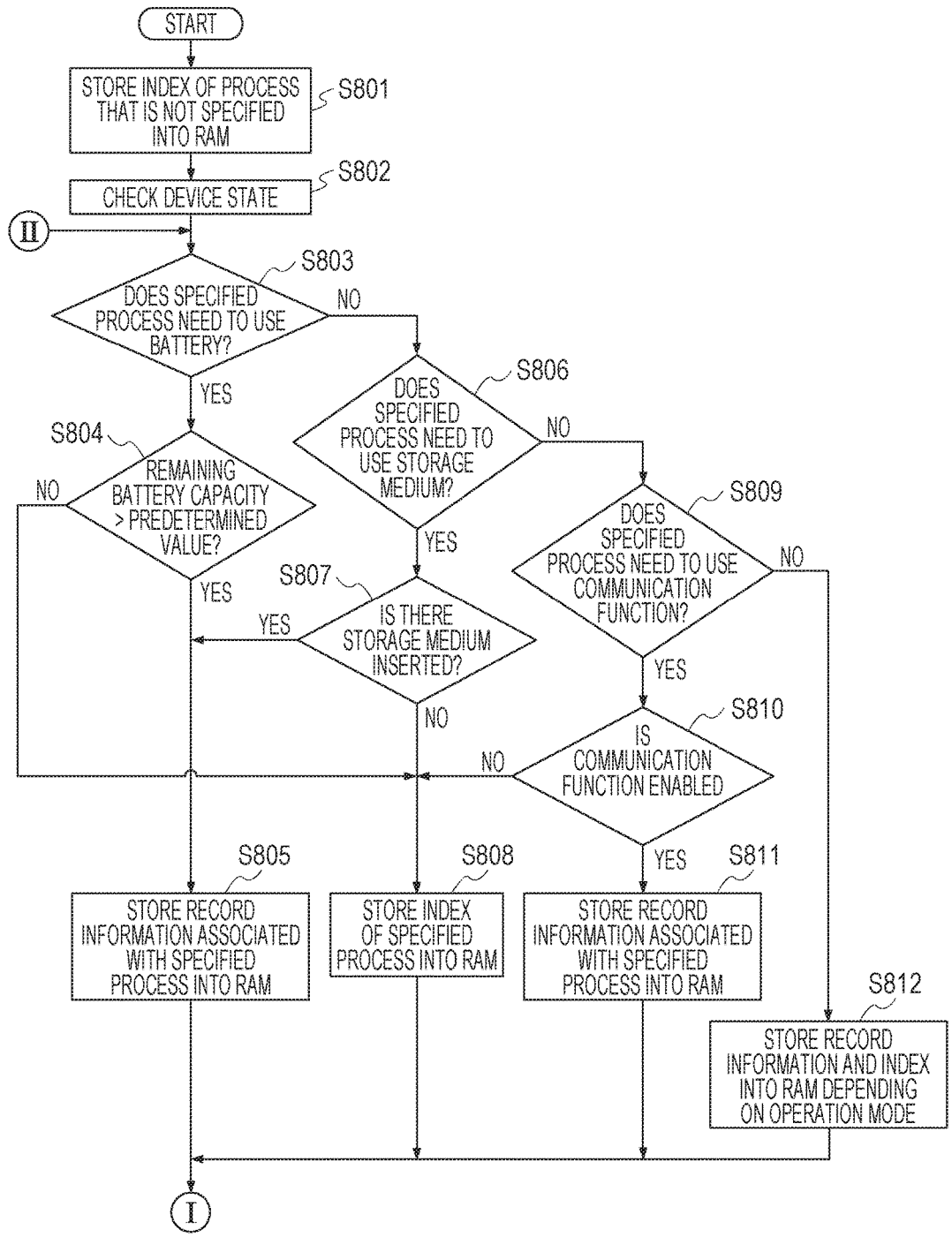

FIGS. 8A and 8B are flow charts illustrating a process performed by the CPU 205 of the electronic device 200 to prepare record information corresponding to an index specified by the communication apparatus 100 according to the present embodiment. Note that the process shown in the flow chart is executed by executing a control program stored in the ROM 206. Note that this flow chart shows details of the process in S608 in FIG. 6. However, the process may be performed periodically in addition to the execution in S608.

In S801, the CPU 205 stores indexes in the RAM 207 for all application processes other than the application process corresponding to the index specified by the communication apparatus 100.

In S802, the CPU 205 checks the device state of each processing unit of the electronic device 200 in a similar manner to S701, and stores the detected device state of each processing unit in the RAM 207.

In S803, the CPU 205 determines whether an application process performed with power supplied from the battery 210 is included in the application processes corresponding to the indexes specified by the communication apparatus 100.

In a case where it is determined that an application process performed with power supplied from the battery 210 is included in the application processes corresponding to the indexes specified by the communication apparatus 100 (YES in S803), the processing flow proceeds to S804. On the other hand, in a case where it is determined that an application process performed with power supplied from the battery 210 is not included in the application processes corresponding to the indexes specified by the communication apparatus 100 (NO in S803), the processing flow proceeds to S806.

In S804, the CPU 205 determines, by controlling the charge control unit 209, whether the remaining battery capacity of the battery 210 is higher than a prescribed value. In a case where it is determined that the remaining battery capacity of the battery 210 is higher than the prescribed value (YES in S804), the processing flow proceeds to S805. However, in a case where it is determined that the remaining battery capacity of the battery 210 is equal to or lower than the prescribed value (NO in S804), the processing flow proceeds to S808.

In S808, the CPU 205 stores, in the RAM 207, an index of the application process specified by the communication apparatus 100, which is performed with power supplied from the battery 210. Thereafter, the processing flow proceeds to S813.

On the other hand, in S805, the CPU 205 stores, in the RAM 207, the record information corresponding to the index specified by the communication apparatus 100. Thereafter, the processing flow proceeds to S813.

Next, in S806, the CPU 205 determines whether an application process using the storage medium 211 is included in the application processes corresponding to the indexes specified by the communication apparatus 100. In a case where an application process using the storage medium 211 is included in the application processes corresponding to the indexes specified by the communication apparatus 100 (YES in S806), the processing flow proceeds to S807. However, in a case where an application process using the storage medium 211 is not included in the application processes corresponding to the indexes specified by the communication apparatus 100 (NO in S806), the processing flow proceeds to S809.

In S807, the CPU 205 determines whether the storage medium 211 is inserted. In a case where it is determined that the storage medium 211 is in the inserted state (YES in S807), the processing flow proceeds to S805. However, in a case where it is determined that the storage medium 211 is not in the inserted state (NO in S807), the processing flow proceeds to S808.

In S809, the CPU 205 determines whether an application process using the wireless communication unit 214 is included in the application processes corresponding to the indexes specified by the communication apparatus 100. In a case where it is determined that an application process using the wireless communication unit 214 is included in the application processes corresponding to the indexes specified by the communication apparatus 100 (YES in S809), the processing flow proceeds to S810. However, in a case where it is determined that an application process using the wireless communication unit 214 is not included in the application processes corresponding to the indexes specified by the communication apparatus 100 (NO in S809), the processing flow proceeds to S812.

In S810, the CPU 205 determines, based on the menu setting state stored in the RAM 207, whether the function of the wireless communication unit 214 is set to be enabled. In a case where it is determined that the function of the wireless communication unit 214 is set to be enabled (YES in S810), the process proceeds to S811. However, in a case where it is determined that the function of the wireless communication unit 214 is set to be disabled (NO in S810), the process proceeds to S808.

In S811, the CPU 205 performs a process in a similar manner to S805. Thereafter, the processing flow proceeds to S813.

In S812, the CPU 205 checks whether an application process that is not capable of being performed in the current device state is included in the application processes corresponding to the indexes specified by the communication apparatus 100. If such an application process is detected, the CPU 205 stores only the index of the detected application process in the RAM 207 without storing record information thereof. Thereafter, the processing flow proceeds to S813.

In S813, the CPU 205 determines whether the total data size of the record information and the indexes stored in the RAM 207 is larger than a maximum data size allowed to be stored in the storage unit 204a. In a case where it is determined that the total data size of the data stored in the RAM 207 is larger than the maximum data size allowed to be stored in the storage unit 204a (YES in S813), the processing flow proceeds to S815. However, in a case where it is determined that the total data size of the data stored in the RAM 207 is equal to or smaller than the maximum data size allowed to be stored in the storage unit 204a (NO in S813), the processing flow proceeds to S814.

In S814, the CPU 205 determines whether the process is completed for all indexes specified by the communication apparatus 100. In a case where it is determined that the process is completed for all indexes specified by the communication apparatus 100 (YES in S814), the process shown in the flow chart is ended, However, in a case where it is determined that the process is not completed for all indexes specified by the communication apparatus 100 (NO in S814), the processing flow returns to S803, to repeat the process.

In S815, the CPU 205 deletes record information of an application process with a low priority level such that the total data size of the data stored in the RAM 207 is equal to or smaller than the maximum data size allowed to be stored in the storage unit 204a, and the CPU 205 stores, in the RAM 207, an index of the application process with the low priority level. The priority level of each application process is predetermined, and the determination is made according to the predetermined priority levels of the application processes.

The operation of the electronic device 200 has been described above.

In the present embodiment, as described above, when a plurality of pieces of record information respectively associated with a plurality of application processes are too large in data size to store them in the storage unit 204a, record information is stored in the storage unit 204a only for application processes most necessary in the status of the electronic device 200 but, as for the other application processes, only indexes thereof are stored. Thus, for application processes most necessary in the status of the electronic device 200, it is possible to read out information necessary in execution by performing a reading process only once. That is, it is possible to perform the process smoothly according to the intention of a user. As for application processes whose record information is not stored in the storage unit 204a, it is possible to read out record information thereof by specifying an index thereof. That is, it is possible to achieve both smooth execution of processes and handling various situations in which application processes are used by a user.

Other Embodiments

In one embodiment described above, in the case where it is not allowed to store record information in the storage unit 204a for all application processes determined to be executed, it is not allowed for the communication apparatus 100 to specify indexes of application processes with low priority levels. That is, for application processes with low priority levels, it is not allowed for the communication apparatus 100 to read out record information thereof even when the communication apparatus 100 retries to read it (in S509 in FIG. 5).

To handle the above-described situation, as for application processes with low priority levels whose record information is not allowed to be read out, it may be allowed for the communication apparatus 100 to read out record information of such application processes by further specifying indexes thereof. In this case, to ensure that it becomes possible to read out record information, specifying indexes is limited to only indexes of the application processes with the low priority levels whose record information was not allowed to be read out. Even in this case, there is a possibility that the capacity of the storage unit 204a is not sufficient to store all information. If this is the case, the process described above is performed repeatedly until record information has been acquired for all necessary application processes. That is, after S508 and S509 are performed in a first-time execution, S508 and S509 are performed repeatedly by specifying indexes in the modified manner until all necessary record information has been acquired.

Instead of modifying the manner in which the communication apparatus 100 specifies indexes as described above, the same indexes may be specified again, the electronic device 200 may properly change the priority levels of the application processes each time reading is performed. In this case, if S508 and S509 are performed repeatedly, then the electronic device 200 changes the priority levels of application processes whose indexes are specified each time S508 and S509 are repeated such that the priority levels are temporarily lowered for application processes whose record information has already been read out. Alternatively, when S508 and S509 are performed repeatedly, of application processes whose indexes are specified, the priority levels of application processes whose record information is still being read out are temporarily raised. This makes it possible for the communication apparatus 100 to acquire all record information required by the communication apparatus 100. The temporarily changed priority levels are returned to the original levels when the loop of specifying indexes and reading out record information is completed.

Each embodiment described above may also be realized by providing a program for realizing one or more functions of the embodiment to a system or an apparatus via a network or a storage medium, and reading out and executing the program by one or more processors in a computer disposed in the system or the apparatus. Each embodiment described above may also be realized using a circuit (for example, an ASIC) for realizing one or more functions of the embodiment.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-145135, filed Jul. 22, 2015, which is hereby incorporated by reference herein in its entirety.

What is claimed is:

1. An electronic device configured to communicate with a communication apparatus, the electronic device comprising:
    a connection interface that connects to a battery;
    a memory accessible from an external apparatus via a close proximity wireless communication;
    at least one processor; and
    instructions memory storing instructions that, when executed by the at least one processor,
    cause the electronic device to perform control such that information used in executing one of a plurality of functions including a wireless power receiving function and an application function, is stored in the memory, wherein the wireless power receiving function is a function for receiving power from the external apparatus wirelessly, and wherein the application is a function that consumes power of the battery and requires a remaining battery capacity,
    wherein, in a case where the remaining capacity of the battery is lower than a predetermined amount, control is performed to store information for executing the wireless power receiving function into the memory and to store information indicating that the electronic device has the application function into the memory,
    wherein, in a case where the remaining capacity of the battery is equal to or higher than the predetermined amount, control is performed to store information for executing the application function into the memory and to store information indicating that the electronic device has the wireless power receiving function into the memory,
    wherein an information amount of the information for executing the wireless power receiving function is larger than an information amount of the information indicating that the electronic device has the wireless power receiving function, and
    wherein an information amount of the information for executing the application function is larger than an information amount of the information indicating that the electronic device has the application function.

2. The electronic device according to claim 1, wherein in a case where information associated with a function different from the wireless power receiving function is stored in the memory, control is performed such that additional information is also stored to indicate that a function different from the wireless power receiving function is supported, and
    wherein use of only the additional information does not allow the external apparatus to execute the supported function different from the wireless power receiving function although the additional information allows the external apparatus to recognize that the function different from the wireless power receiving function is supported.

3. The electronic device according to claim 2, wherein in a case where the external apparatus issues a request to execute the function different from the wireless power receiving function, the control unit rewrites information in the memory such that information associated with the function different from the wireless power receiving function is stored in the memory.

4. The electronic device according to claim 1, wherein in a case where the information associated with the function different from the wireless power receiving function is stored in the memory, control is performed such that additional information is also stored to indicate that the wireless power receiving function is supported, and
    wherein use of only the additional information does not allow the external apparatus to execute the wireless power receiving function although the additional information allows the external apparatus to recognize that the wireless power receiving function is supported.

5. The electronic device according to claim 4, wherein in a case where the external apparatus issues a request to execute the wireless power receiving function, the control unit rewrites information in the memory such that information associated with the wireless power receiving function is stored in the memory.

6. The electronic device according to claim 1, wherein in a case where power of the electronic device is turned off, control is performed such that the information associated with the wireless power receiving function is stored in the memory before the power is turned off.

7. The electronic device according to claim 1, wherein in a case where power of the electronic device was turned on, control is performed such that the information associated with a function different from the wireless power receiving function is stored in the memory.

8. The electronic device according to claim 1, further comprising a communication interface configured to connect to the external apparatus via wireless communication different from the close proximity wireless communication,
    wherein functions from among the plurality of functions that are different from the wireless power receiving function include a communication function using the communication interface, and
    wherein in a case where information associated with the communication function is stored in the memory, control is performed such that a communication parameter used by the communication interface is stored in the memory.

9. The electronic device according to claim 8, wherein in a case where the communication function is executed, control of the communication interface is performed such that a network is generated using the communication parameter shared with the external apparatus via the memory.

10. The electronic device according to claim 8, further comprising an image capture device, wherein control is performed such that image data captured by the image capture device is transmitted to the external apparatus via the communication interface.

11. A method of controlling an electronic device including a battery and a memory accessible from an external apparatus via close proximity wireless communication, the method comprising:
performing control such that information used in executing one of a plurality of functions including a wireless power receiving function and an application function is stored in the memory, wherein the wireless power receiving function is a function of receiving power from the external apparatus wirelessly, and wherein the application function is a function that consumes power of the battery and requires a remaining battery capacity; and
detecting a charge status of the battery,
wherein, in a case where the remaining capacity of the battery is lower than a predetermined amount, control is performed to store information for executing the wireless power receiving function into the memory and to store information indicating that the electronic device has the application function into the memory,
wherein, in a case where the remaining capacity of the battery is equal to or higher than the predetermined amount, control is performed to store information for executing the application function into the memory and to store information indicating that the electronic device has the wireless power receiving function into the memory,
wherein an information amount of the information for executing the wireless power receiving function is larger than an information amount of the information indicating that the electronic device has the wireless power receiving function, and
wherein an information amount of the information for executing the application function is larger than an information amount of the information indicating that the electronic device has the application function.

12. The method of controlling the electronic device according to claim 11, wherein control is performed differently depending on the charge status of the battery such that the information associated with the wireless power receiving function is stored in the memory or information associated with a function different from the wireless power receiving function is stored depending on the charge status of the battery.

13. The method of controlling the electronic device according to claim 12, wherein in a case where information associated with a function different from the wireless power receiving function is stored in the memory, control is performed such that additional information is also stored to indicate that a function different from the wireless power receiving function is supported, and
wherein use of only the additional information does not allow the external apparatus to execute the supported function different from the wireless power receiving function although the additional information allows the external apparatus to recognize that the function different from the wireless power receiving function is supported.

14. The method of controlling the electronic device according to claim 13, wherein in a case where the external apparatus issues a request to execute the function different from the wireless power receiving function, information is rewritten in the memory such that information associated with the function different from the wireless power receiving function is stored in the memory.

15. The method of controlling the electronic device according to claim 12, wherein in a case where the information associated with the function different from the wireless power receiving function is stored in the memory, control is performed such that additional information is also stored to indicate that the wireless power receiving function is supported, and
wherein use of only the additional information does not allow the external apparatus to execute the wireless power receiving function although the additional information allows the external apparatus to recognize that the wireless power receiving function is supported.

16. The method of controlling the electronic device according to claim 15, wherein in a case where the external apparatus issues a request to execute the wireless power receiving function, information is rewritten in the memory such that information associated with the wireless power receiving function is stored in the memory.

17. The method of controlling the electronic device according to claim 11, wherein in a case where power of the electronic device is turned off, control is performed such that the information associated with the wireless power receiving function is stored in the memory before the power is turned off.

18. The method of controlling the electronic device according to claim 11, wherein in a case where power of the electronic device was turned on, control is performed such that the information associated with a function different from the wireless power receiving function is stored in the memory.

19. A non-transitory computer-readable storage medium which stores a program for causing an electronic device to execute a method, the electronic device including a battery and a memory accessible from an external apparatus via close proximity wireless communication, the method comprising:
performing control such that information used in executing one of a plurality of functions including a wireless power receiving function and an application function is stored in the memory, wherein the wireless power receiving function is a function of receiving power from the external apparatus wirelessly, and wherein the application function is a function that consumes power of the battery and requires a remaining battery capacity; and
detecting a charge status of the battery,
wherein, in a case where the remaining capacity of the battery is lower than a predetermined amount, control is performed to store information for executing the wireless power receiving function into the memory and to store information indicating that the electronic device has the application function into the memory,
wherein, in a case where the remaining capacity of the battery is equal to or higher than the predetermined amount, control is performed to store information for executing the application function into the memory and to store information indicating that the electronic device has the wireless power receiving function into the memory, wherein an information amount of the information for executing the wireless power receiving function is larger than an information amount of the information indicating that the electronic device has the wireless power receiving function, and wherein an information amount of the information for executing the application function is larger than an information amount of the information indicating that the electronic device has the application function.

\* \* \* \* \*